(12) United States Patent
Lai et al.

(10) Patent No.: US 11,321,499 B2
(45) Date of Patent: May 3, 2022

(54) SYSTEM, METHOD, AND COMPUTER PROGRAM PRODUCT FOR INTERACTIVE USER INTERFACES

(71) Applicant: Macy's, Inc., New York, NY (US)

(72) Inventors: Willy Hwang Lai, Palo Alto, CA (US); Henry Gene Kuo, Alameda, CA (US); Hafez Charles Janssens, San Francisco, CA (US); Katherine Key Rott, San Francisco, CA (US)

(73) Assignee: Macy's, Inc., New York, NY (US)

( * ) Notice: Subject to any disclaimer, the term of this patent is extended or adjusted under 35 U.S.C. 154(b) by 0 days.

(21) Appl. No.: 16/846,674

(22) Filed: Apr. 13, 2020

(65) Prior Publication Data

US 2021/0319148 A1    Oct. 14, 2021

(51) Int. Cl.
| | |
|---|---|
| *G06F 30/12* | (2020.01) |
| *G06F 16/532* | (2019.01) |
| *G06F 3/0484* | (2013.01) |
| *G06F 3/04845* | (2022.01) |

(52) U.S. Cl.
CPC .......... *G06F 30/12* (2020.01); *G06F 3/04845* (2013.01); *G06F 16/532* (2019.01)

(58) Field of Classification Search
USPC ....................................................... 715/763
See application file for complete search history.

(56) References Cited

U.S. PATENT DOCUMENTS

| | | |
|---|---|---|
| D673,967 S | 1/2013 | Pearcy et al. |
| D692,451 S | 10/2013 | Pearcy et al. |
| D700,192 S | 2/2014 | Kaplan et al. |
| D711,898 S | 8/2014 | Edman |
| D716,831 S | 11/2014 | Schoger et al. |
| D720,362 S | 12/2014 | Schoger et al. |
| D720,366 S | 12/2014 | Hiltunen et al. |
| D725,145 S | 3/2015 | Johnson |
| D728,622 S | 5/2015 | Myung et al. |
| D753,712 S | 4/2016 | Lee |
| D781,302 S | 3/2017 | Baguley et al. |
| D790,561 S | 6/2017 | Torchin et al. |
| D795,907 S | 8/2017 | Edman |
| D802,014 S | 11/2017 | Dragoi et al. |
| D841,671 S | 2/2019 | Clavin et al. |
| D856,367 S | 8/2019 | Anand et al. |
| D865,804 S | 11/2019 | Warner et al. |

(Continued)

*Primary Examiner* — Sherief Badawi
*Assistant Examiner* — Conrad R Pack
(74) *Attorney, Agent, or Firm* — The Webb Law Firm

(57) ABSTRACT

Provided is a method, system, and computer program product for providing an interactive user interface. The method includes generating a user interface including a visual representation of a body having a garment arranged thereon, generating a plurality of vector lines corresponding to portions of the body and the garment, detecting a user input on a portion of the garment, the portion of the garment having an end portion aligned with a first point of the at least three points of the vector line, determining a second point of the at least three points of the vector line based on the user input on the portion of the garment, and automatically modifying the visual representation of the garment to move the end portion in alignment with the second point of the at least three points in response to determining the second point of the vector line.

3 Claims, 7 Drawing Sheets

(56) References Cited

U.S. PATENT DOCUMENTS

| | | |
|---|---|---|
| D870,751 S | 12/2019 | Peeters et al. |
| D882,598 S | 4/2020 | Belliveau |
| 10,861,200 B1 | 12/2020 | Graham |
| D914,714 S | 3/2021 | Dascola et al. |
| D923,028 S | 6/2021 | Perron et al. |
| 2007/0294142 A1* | 12/2007 | Kattner ................. G06Q 30/06 705/27.2 |
| 2012/0218262 A1 | 8/2012 | Yomdin et al. |
| 2013/0113830 A1* | 5/2013 | Suzuki ................. G06T 19/006 345/634 |
| 2014/0114620 A1* | 4/2014 | Grinspun ............... G06T 19/00 703/1 |
| 2014/0249961 A1* | 9/2014 | Zagel ................ G06K 9/00369 705/26.61 |
| 2019/0011700 A1* | 1/2019 | Reiner .................... G03H 1/04 |
| 2019/0087073 A1* | 3/2019 | Ruby ................. G06F 3/04845 |
| 2019/0130649 A1* | 5/2019 | O'Brien ............... G06T 15/005 |
| 2019/0244407 A1* | 8/2019 | Wiesel ............... G06K 9/00369 |
| 2020/0066022 A1 | 2/2020 | Leong et al. |
| 2020/0077728 A1* | 3/2020 | Gerson ............. G06Q 30/0621 |
| 2021/0049817 A1* | 2/2021 | Lee .................... G06Q 30/0643 |
| 2021/0095973 A1 | 4/2021 | Simard et al. |

* cited by examiner

SYSTEM, METHOD, AND COMPUTER PROGRAM PRODUCT FOR INTERACTIVE USER INTERFACES

BACKGROUND OF THE INVENTION

1. Field of the Invention

This invention relates generally to user interfaces and, in particular embodiments, to a system, method, and computer program product for providing interactive user interfaces for designing apparel.

2. Technical Considerations

Custom apparel is often designed with an in-person fitting and measurement, with a customer requesting their desired features. Existing systems to enable customers to customize apparel remotely through a computing device require such customers to choose from numerous selections and drop-down menus to specify their desired features.

SUMMARY OF THE INVENTION

According to non-limiting embodiments or aspects, provided is a computer-implemented method for providing an interactive user interface, comprising: generating, with at least one processor, a user interface comprising a visual representation of a body having a garment arranged thereon; generating, with at least one processor, a plurality of vector lines corresponding to portions of the body and the garment, wherein each vector line of the plurality of vector lines comprises at least three points including a start point, an end point, and at least one middle point; detecting, with at least one processor, a user input on a portion of the garment corresponding to a vector line of the plurality of vector lines, the portion of the garment having an end portion aligned with a first point of the at least three points of the vector line; determining, with at least one processor, a second point of the at least three points of the vector line based on the user input on the portion of the garment; and automatically modifying the visual representation of the garment to move the end portion in alignment with the second point of the at least three points in response to determining the second point of the vector line.

In non-limiting embodiments or aspects, the end portion of the garment comprises at least one of the following: a sleeve edge, a pant leg edge, a skirt edge, a neck edge, a shirt edge, a waist edge, or any combination thereof. In non-limiting embodiments or aspects, the method further comprises: detecting, with at least one processor, a second user input on a second portion of the garment corresponding to a second vector line of the plurality of vector lines, the second portion of the garment having a second end portion aligned with a first point of the at least three points of the second vector line; determining, with at least one processor, a second point of the at least three points of the second vector line based on the second user input on the second portion of the garment; and automatically modifying the visual representation of the garment to move the second end portion in alignment with the second point of the at least three points in response to determining the second point. In non-limiting embodiments or aspects, the vector line comprises a curved line corresponding to a curve of the body. In non-limiting embodiments or aspects, modifying the visual representation of the garment comprises: determining at least one image segment of the visual representation corresponding to the end portion aligning with the first point of the at least three points of the vector line; and replacing the at least one image segment with at least one replacement image segment corresponding to the end portion aligning with the second point of the at least three points of the vector line. In non-limiting embodiments or aspects, the method further comprises: downloading, in a client-side application executing on a computing device displaying the user interface, a plurality of images corresponding to different visual representations of the body and the garment prior to detecting the user input, wherein modifying the visual representation of the garment comprises replacing at least one image with at least one or more other images of the plurality of images.

According to non-limiting embodiments or aspects, provided is a system for providing an interactive user interface, comprising: at least one data storage device comprising an image database including a plurality of images; and at least one processor in communication with the at least one data storage device, the at least one processor programmed or configured to: generate a user interface comprising a visual representation of a body having a garment arranged thereon based on at least one image of the plurality of images; generate a plurality of vector lines corresponding to portions of the body and the garment, wherein each vector line of the plurality of vector lines comprises at least three points including a start point, an end point, and at least one middle point; detect a user input on a portion of the garment corresponding to a vector line of the plurality of vector lines, the portion of the garment having an end portion aligned with a first point of the at least three points of the vector line; determine a second point of the at least three points of the vector line based on the user input on the portion of the garment; and automatically modify the visual representation of the garment to move the end portion in alignment with the second point of the at least three points in response to determining the second point of the vector line.

In non-limiting embodiments or aspects, the end portion of the garment comprises at least one of the following: a sleeve edge, a pant leg edge, a skirt edge, a neck edge, or any combination thereof. In non-limiting embodiments or aspects, the at least one processor is further programmed or configured to: detect a second user input on a second portion of the garment corresponding to a second vector line of the plurality of vector lines, the second portion of the garment having a second end portion aligned with a first point of the at least three points of the second vector line; determine a second point of the at least three points of the second vector line based on the second user input on the second portion of the garment; and automatically modify the visual representation of the garment to move the second end portion in alignment with the second point of the at least three points in response to determining the second point. In non-limiting embodiments or aspects, the vector line comprises a curved line corresponding to a curve of the body. In non-limiting embodiments or aspects, wherein modifying the visual representation of the garment comprises: determining at least one image segment of the visual representation corresponding to the end portion aligning with the first point of the at least three points of the vector line; and replacing the at least one image segment with at least one replacement image segment corresponding to the end portion aligning with the second point of the at least three points of the vector line. In non-limiting embodiments or aspects, the at least one processor is further programmed or configured to: download, in a client-side application executing on a computing device displaying the user interface, a plurality of images corresponding to different visual representations of the body and the garment prior to detecting the user input, wherein modifying the visual representation of the garment comprises replacing at least one image with at least one or more other images of the plurality of images.

According to non-limiting embodiments or aspects, provided is a computer program product for providing an interactive user interface, comprising at least one non-transitory computer-readable medium including program instructions that, when executed by at least one processor, cause the at least one processor to: generate a user interface comprising a visual representation of a body having a garment arranged thereon based on at least one image of a plurality of images; generate a plurality of vector lines corresponding to portions of the body and the garment, wherein each vector line of the plurality of vector lines comprises at least three points including a start point, an end point, and at least one middle point; detect a user input on a portion of the garment corresponding to a vector line of the plurality of vector lines, the portion of the garment having an end portion aligned with a first point of the at least three points of the vector line; determine a second point of the at least three points of the vector line based on the user input on the portion of the garment; and automatically modify the visual representation of the garment to move the end portion in alignment with the second point of the at least three points in response to determining the second point of the vector line.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE INVENTION

Figure 1:
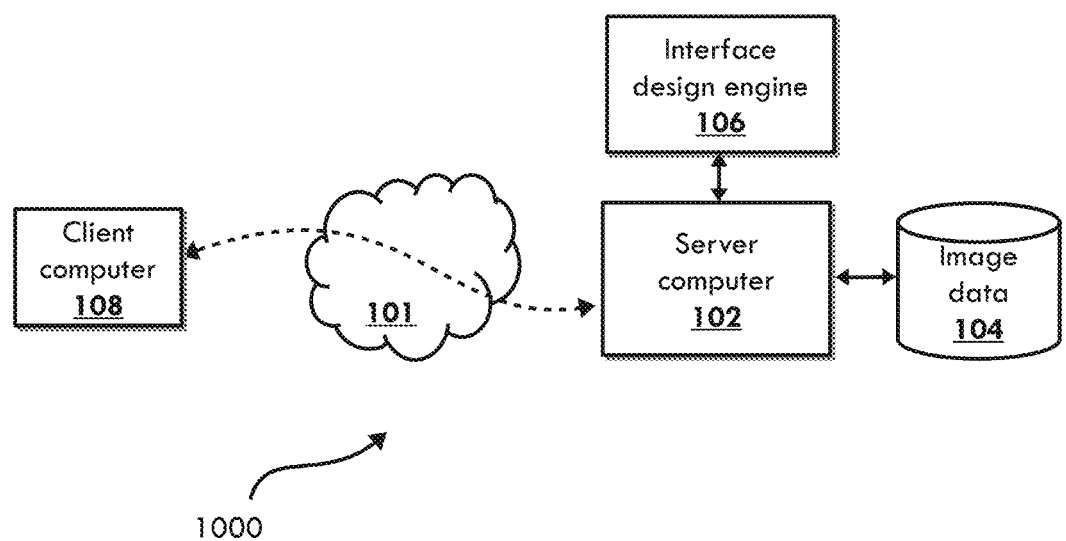
FIG. 1 is a schematic diagram of a system for providing interactive user interfaces for designing apparel according to non-limiting embodiments.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. It will be appreciated that numerous other arrangements are possible.

As used herein, the term "computing device" may refer to one or more electronic devices configured to process data, such as a processor (e.g., a CPU, a microcontroller, and/or any other data processor). A computing device may, in some examples, include the necessary components to receive, process, and output data, such as a display, a processor, a memory, an input device, and a network interface. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may also be a desktop computer or other form of non-mobile computer.

As used herein, the term "server" may refer to or include one or more computing devices that are operated by or facilitate communication and/or processing for multiple parties in a network environment, such as the Internet, although it will be appreciated that communication may be facilitated over one or more public or private network environments and that various other arrangements are possible. Further, multiple computing devices (e.g., servers, other computing devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Referring now to FIG. 1, a system 1000 for providing interactive GUIs is shown according to a non-limiting embodiment. A server computer 102, such as a web server, is in communication with a data storage device including an image database 104. The server computer 102 is also in communication with an interface design engine 106. Through a network environment 101, such as the internet, the server computer 102 communicates with a plurality of client computing devices including a client computer 108. In examples in which the server computer 102 includes a web server, the server computer 102 and client computer 108 may communicate via one or more web-based protocols, such as HTTP, such that the server computer provides content and the client computer navigates the content and provides user input. The client computer 108 may execute a software application to facilitate this communication, such as a web browser, a dedicated software application (e.g., such as a mobile application), and/or the like. It will be appreciated that the client computer 108 and server computer 102 may communicate in various ways and using various different protocols.

With continued reference to FIG. 1, the image database 104 may include several images of bodies and garments. For example, the images may include bodies (e.g., photographs or illustrations of models) and garments (e.g., photographs or illustrations or articles of clothing). In some non-limiting embodiments, each image may include a body wearing a different garment such that a single image depicts all or a portion of a model wearing a garment. In some non-limiting embodiments, images of bodies and images of garments may be separate but associated in the database 104 with spatial relationships. For example, an image of a garment may include a transparent background and be overlaid on an image of a model based on spatially aligning the images. The term "design object," as used herein, refers to related data for a body and garment combination that is used to generate an interactive, visual representation of the body and garment. A design object may include numerous related images, parameters associated with the images (e.g., including spatial relation data), metadata, and/or the like. In some non-limiting embodiments, the images of bodies and/or garments may be portions of full images of the bodies and/or garments. For example, a visual representation of a model wearing a garment may be formed from a plurality of different images of portions of the body and/or garment. Such portions may be divided segments of a full image (e.g., rectangular blocks in an image matrix) and/or the like. All of the image portions for a particular garment and body combination may be part of a design object for that combination.

The interface design engine 106 may include one or more software and/or hardware components configured to facilitate the creation of a design object and a visual representation generated based on the design object. As an example, the interface design engine 106 may include an editing interface configured to facilitate a user to add images, specify parameters, and design the arrangement of portions of the interactive GUI. Various tools may be used to specify spatial relationships between the garment and the body, to define the trajectory of various vector lines, to define the number and placement of points along each vector line, to define default positions, and/or the like. A user may also specify parameters concerning the visual appearance of an interaction, such as when vector lines appear and/or are made invisible (e.g., when selected, before any interaction, after an interaction, and/or the like), how and when selectable nodes appear and/or are made invisible, and/or the like.

Figure 2A:
FIGS. 2A-2H are interactive graphical user interfaces (GUIs) for designing apparel according to non-limiting embodiments.

Referring now to FIG. 2A, an interactive GUI 200 is shown according to a non-limiting embodiment. The GUI 200 includes a visual representation 204 of a body wearing a garment. As described herein, the visual representation 204 may be comprised of one or more images of a body, garment, and/or a combination of portions of a garment arranged on portions of a body. The visual representation includes three vector lines including vector line 208. The vector lines may be visually represented as solid lines, broken lines, and/or the like. In some examples, the vector lines may not be visible or may only be visible in certain conditions. Each vector line, including vector line 208, includes a start point, an end point, and a line (e.g., a straight line or a curved line) connecting the start point and end point. Each vector line may also include one or additional points throughout the line. The additional points may be evenly spaced throughout the line or, in other examples, may exist at specified locations along the line. Although FIG. 2A shows a visual representation 204 having three vector lines corresponding to a sleeve length, neck line, and skirt length, one or any number of vector lines may be used in non-limiting embodiments.

With continued reference to FIG. 2A, the GUI 200 may include selectable options that a user can interact with. Selectable nodes, such as selectable node 210, may be visually represented as icons, shapes, highlighting, and/or the like. The selectable nodes 210 may always be visible, may be invisible until user interaction (e.g., a user touch, a mouse-over event, a mouse-click event, a gesture, etc.), may always be invisible but may change the appearance of the cursor used to interact with it (e.g., change the cursor from an arrow to an icon), and/or the like. It will be appreciated that the selectable nodes 210 may be presented in various forms. In non-limiting embodiments, the selectable nodes 210 are displayed adjacent to or overlaid on an end portion of a garment. As used herein, an "end portion" of a garment may include any portion of a garment that may change in length or dimension such as, but not limited to, a sleeve edge, a pant leg edge, a skirt edge (e.g., the bottom of a skirt), a neck edge (e.g., a neck opening in a shirt), a waist edge (e.g., the primary opening in a pair of pants or a skirt), a shirt edge (e.g., the primary opening in a shirt), and/or the like.

In non-limiting embodiments, and with continued reference to FIG. 2A, the selectable nodes 210 may be movable along the vector lines. In some non-limiting embodiments, the selectable nodes 210 may be moved smoothly across the vector lines. In other non-limiting embodiments, the selectable nodes 210 may move across the vector lines by aligning with (e.g., snapping to) one or more points along the vector line between the start point and the end point of the vector line. The vector line 208 and/or the selectable node 210 may or may not be made visible during movement of the selectable node 210 along the vector line 208. Each vector line on the visual representation 204 may be associated with a selectable node that may be moved along the vector line.

In non-limiting embodiments in which the selectable nodes 210 may be moved smoothly along a vector line, upon the user finishing the movement (e.g., letting go of the node), a percentage of the vector line traversed by the node may be determined and, based on that determination, the closest point along the vector line may be identified. In response to the user completing movement of the node, the node and the corresponding garment portion may be moved to the closest point. In some non-limiting embodiments, once a user initially selects a node, the user may move the node by moving the mouse, mouse scroll wheel, arrow keys, and/or the like, even if the cursor is not directly over the node or garment.

In non-limiting embodiments, and with continued reference to FIG. 2A, the garment 206 may be associated with one or more default parameter values for how the visual representation 204 is displayed. In the example shown in FIG. 2A, the default parameter value for the selectable node 210 is the starting point of each vector line 208. However, it will be appreciated that the default value may be any predetermined point along the vector line 208. Moreover, in some non-limiting embodiments, one or more preexisting designs may be chosen from, where each preexisting design is associated with preset values for how the garment appears with respect to the vector lines 208. In this manner, a user may start with a preexisting design and then customize the garment 206 from there. In non-limiting embodiments, users may save their designs and share them with other users, such that the other users may use the design as a preexisting design to customize their own designs.

Figure 2B:
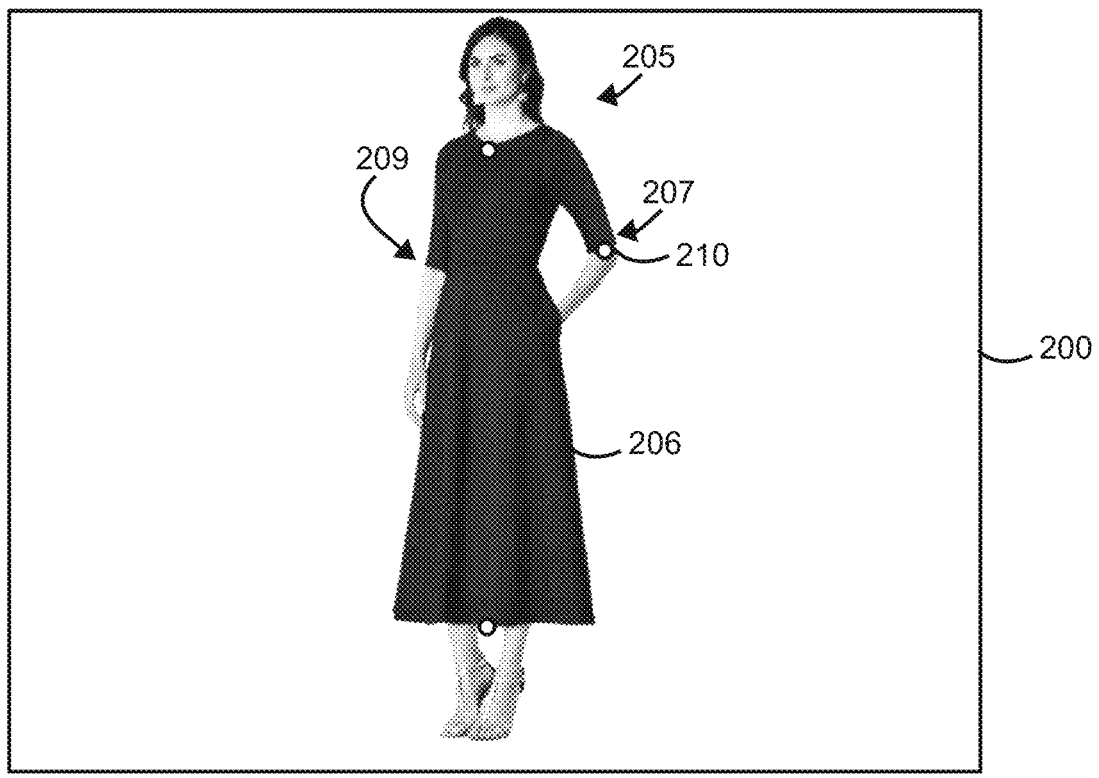
Figure 2C:

Referring now to FIG. 2B, the GUI 200 is shown with a visual representation 205 in which the selectable node 210 and an edge 207 of the sleeve corresponding to the selectable node 210 have been moved along the vector line (not shown in FIG. 2B) to a point between the start point and the end point. In the depicted non-limiting embodiment, the vector line (208 in FIG. 2A) is made invisible after the user moves the selectable node 210 and/or while the user moves the selectable node 210. Further, a second edge 209 of a sleeve corresponding to the first edge 207 may also be moved in the same manner. In some non-limiting embodiments, one or more portions of a garment, such as the first edge 207 and second edge 209, may be linked in the image database (104 in FIG. 1) such that interaction with one portion affects the other portion. In other non-limiting embodiments, corresponding portions of a garment may be separately customized Referring now to FIG. 2C, the GUI 200 is shown with a visual representation 211 in which the selectable node 210 (not shown in FIG. 2C) and the edge 207 of the sleeve corresponding to the selectable node 210 have been moved along the vector line (not shown in FIG. 2C) to the end point. It will be appreciated that multiple points may be chosen between the start point and the end point. As described with respect to FIG. 2B, movement of the first edge 207 may automatically cause the second edge 209 of the sleeve to be moved in a corresponding manner.

Figure 2D:
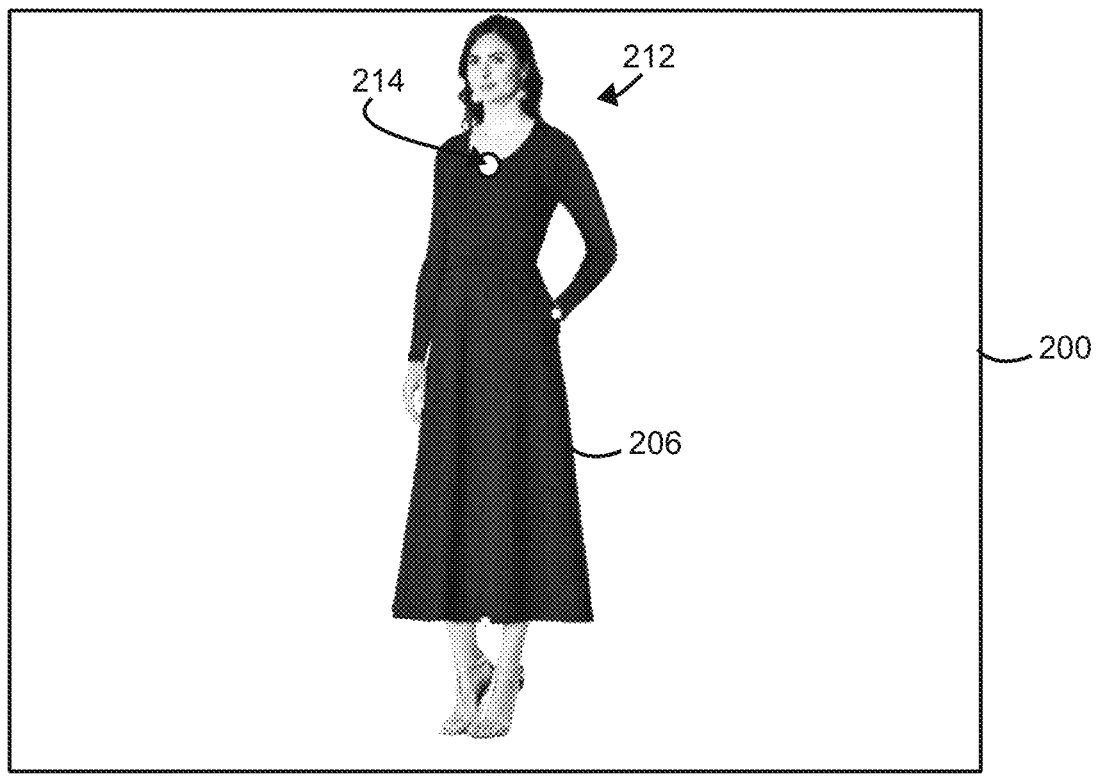
Figure 2E:
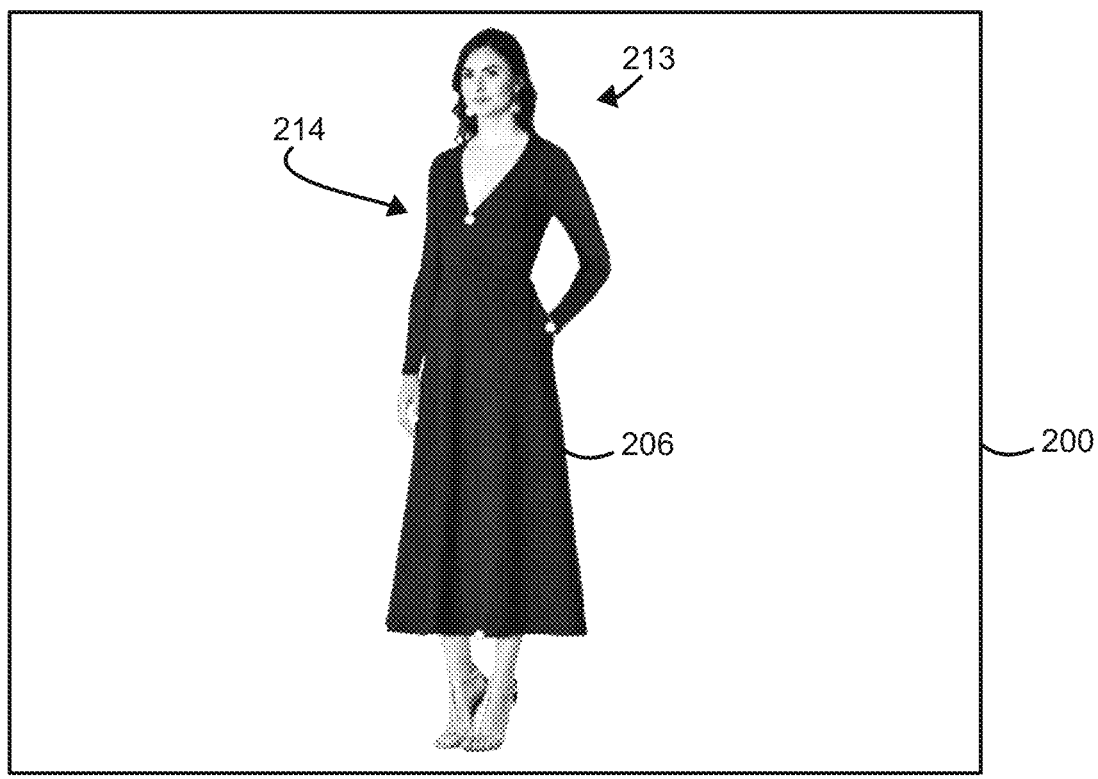

Referring now to FIG. 2D, the GUI 200 is shown with a visual representation 212 in which an edge 214 of the garment (a neck edge) has been moved along a vector line (not shown in FIG. 2D) from a start point to a second point between the start point and the end point. FIG. 2E shows the GUI 200 having another visual representation 213 in which the edge 214 of the garment has been moved further along the vector line to an end point.

Figure 2F:
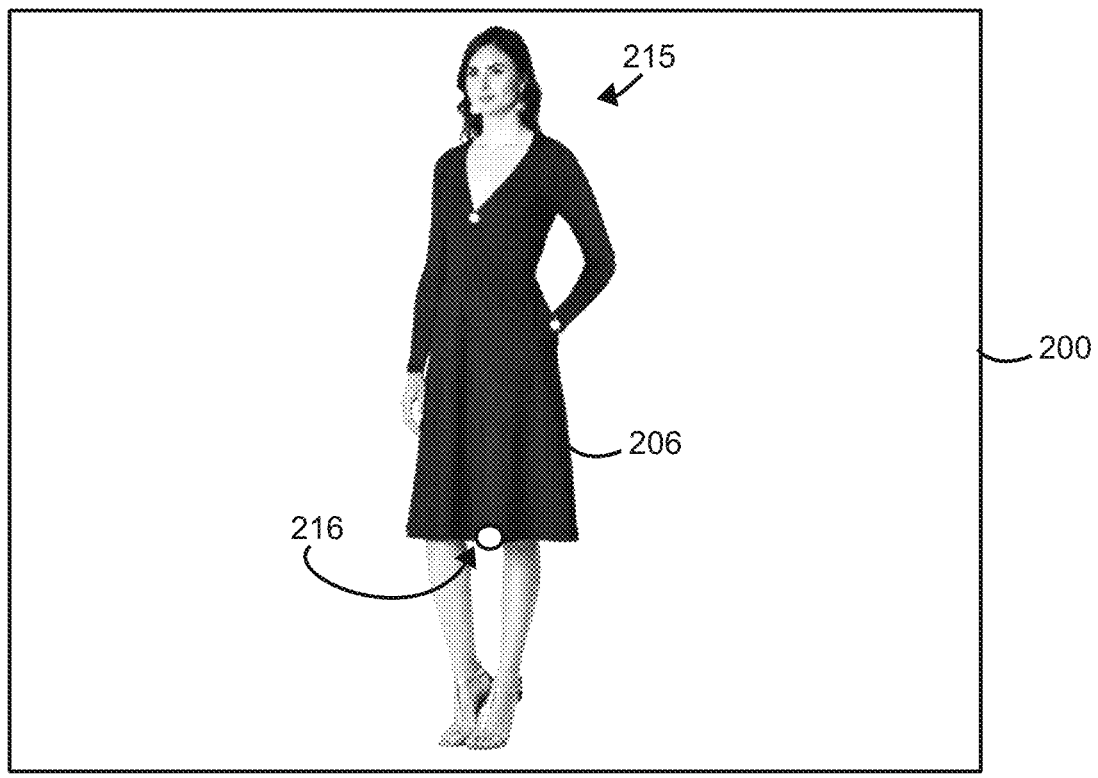
Figure 2G:
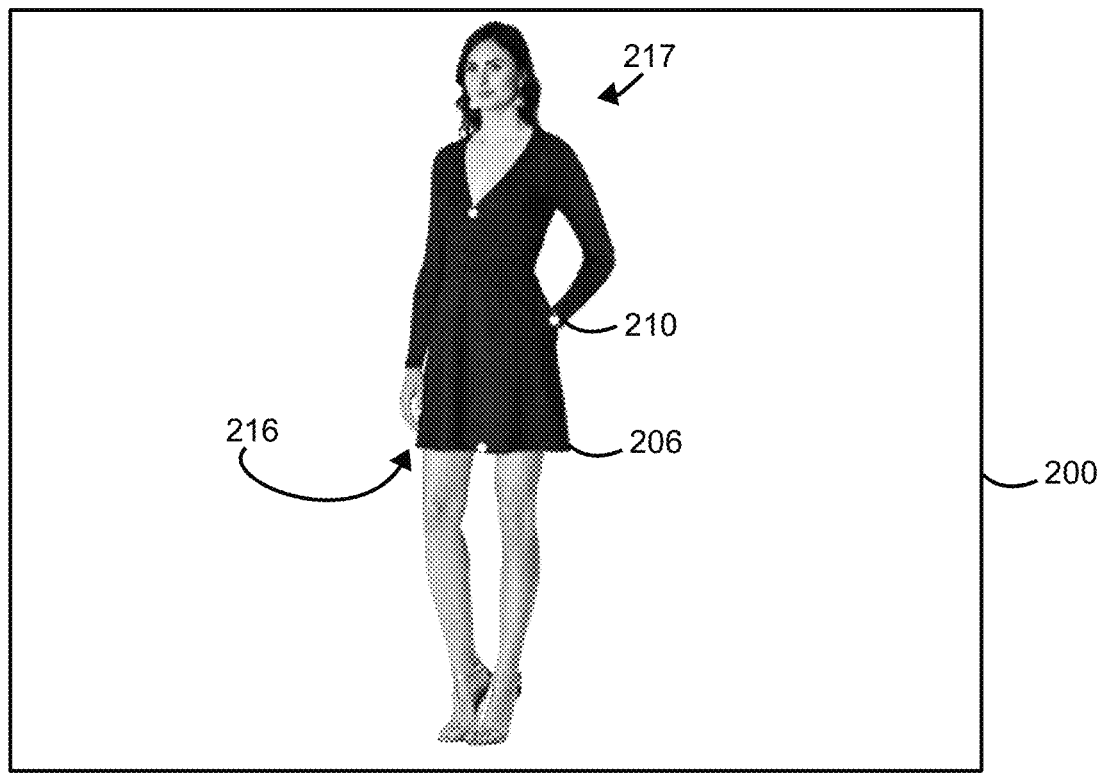

Referring now to FIG. 2F, the GUI 200 is shown with a visual representation 215 in which an edge 216 of the garment (a skirt edge) has been moved along a vector line (not shown in FIG. 2F) from a start point to a second point. FIG. 2G shows the GUI 200 having another visual representation 217 in which the edge 216 of the garment has been moved further along the vector line to an end point.

Figure 2H:

Referring now to FIG. 2H shows another view of the GUI 200 in which other selectable options are provided. For example, FIG. 2H shows selectable options 220 for choosing a size and color. In non-limiting embodiments, a design object for a body and garment combination may include images for each available color option. In other non-limiting embodiments, one or more images for a garment may be digitally altered to change color. In non-limiting embodiments, different sizes or ranges of sizes may be associated with different bodies and, as a result, different design objects. In other non-limiting embodiments, a single body and design object may be used for all sizes.

It will be appreciated that selectable nodes may be presented on various portions of the garment and may not always correspond to end portions. For example, selectable nodes may be manipulated by a user to adjust width, style, and/or the like. Moreover, it will be appreciated that, in some non-limiting embodiments, manipulation of a selectable node may be freeform and not restricted based on a vector line.

In non-limiting embodiments, and referring back to FIG. 1, the images for a particular body and garment may be loaded in various ways from the image database 104. In non-limiting embodiments, all potential configurations of a body and garment combination (e.g., every permutation of selectable points) may be a single image and rendered on the client computer 108 as such. The images for a body and garment combination may be initially downloaded to the client computer 108 and loaded in the background of a web browser, mobile application, or other application executing on the client computer 108. When the user manipulates any selectable node (e.g., slides a node), the corresponding image may be determined and rendered from memory, thus reducing the time between user interaction and rendering the visual representation. In some non-limiting embodiments, instead of preloading every possible image with the initial page load, when a user manipulates one selectable node to a first position (e.g., moving a sleeve edge to a first position), all potential configurations that correspond to that first position (e.g., all permutations in which the sleeve length is shown as selected) may be loaded in the background in response. In this manner, a subset of images may be loaded to reduce the time between the next user interaction (e.g., with a different selectable node and different portion of the garment) and rendering the resulting visual representation.

In some non-limiting embodiments, the image database 104 may include portions of bodies and/or garments that collectively form a visual representation of a body and garment combination. In such non-limiting embodiments, only the portions of the visual representation that are affected by the user manipulation may be changed by replacing one or more images. As an example, the visual representation may be a matrix of different images of a body and garment combination. As a user modifies one aspect of the garment, images in other sections of the visual representation do not need to be changed. Thus, the user interaction may be smoother and require less bandwidth and data being communicated between the server computer 102 and the client computer 108. As an example, with reference to FIGS. 2B-2C, as the edge 207 of the sleeve is modified, the lower half of the image does not change and the one or more images representing the lower half of the image can remain while other images including the sleeve may be replaced with other images.

In some non-limiting embodiments, the image database 104 may include bodies and portions of garments that collectively form a visual representation of a body and garment combination. In such non-limiting embodiments, a base image of the body may be presented and overlaid with one or more images representing the garment. In some examples, the garment may be rendered as vector images (e.g., vector graphics generated based on input geometries) rather than pixel-based images.

Figure 3:
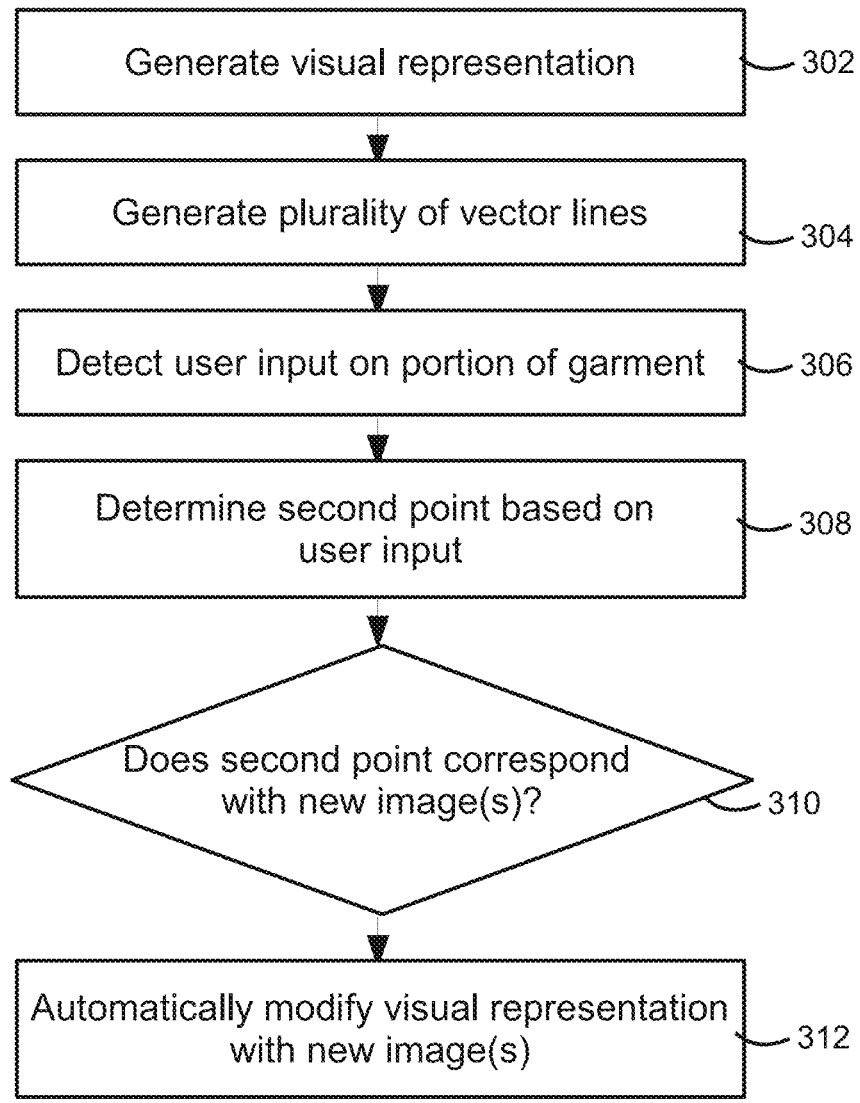
FIG. 3 is a flow diagram of a method of providing interactive GUIs for designing apparel according to non-limiting embodiments.

Referring now to FIG. 3, a flow diagram is shown for a method of providing interactive GUIs for designing apparel according to non-limiting embodiments. It will be appreciated that the steps shown in FIG. 3 are for example purposes only and that different steps, additional steps, and/or a different order of steps may be used. At a first step 302, a visual representation is generated. The visual representation may be generated for a selected body and garment combination. In some examples, default values may be associated with the body and garment combination such that the initial visual representation displayed includes a garment appearing with preset, default parameters. At a next step 304, a plurality of vector lines may be generated. The vector lines may be visible or invisible and may include multiple points including a start point, an end point, and one or more intermediate points. As an example, the vector lines may be generated in the background of an application, such as a web browser, that displays the visual representation and stores coordinate data for the vector lines and/or points along the vector lines.

With continued reference to FIG. 3, at step 306 user input is detected on a portion of the garment. As an example, a user may drag or slide a portion of a garment. A user's interaction may, in some examples, involve movement of a visible or invisible node that moves along a vector line generated at step 304. In response to detecting such user input, the method proceeds to step 308 in which a second point is determined. For example, a user may move a selectable node from a start point to an intermediate point or end point. In non-limiting embodiments in which a user may move the cursor and/or selectable node smoothly along the vector line, step 308 may include a determination of a closest point of a plurality of preset points along the vector line. Once a second point is determined, at step 310 it is determined if one or more new images correspond with that selection. For example, at step 310 it may be determined that a single image of the full visual representation should be replaced, that a single image of a portion of the full visual representation should be replaced, that multiple images of the full visual representation should be replaced, and/or the like. At step 312, the visual representation is modified with the one or more new images such that the user is presented with a customized garment on the body.

Figure 4:
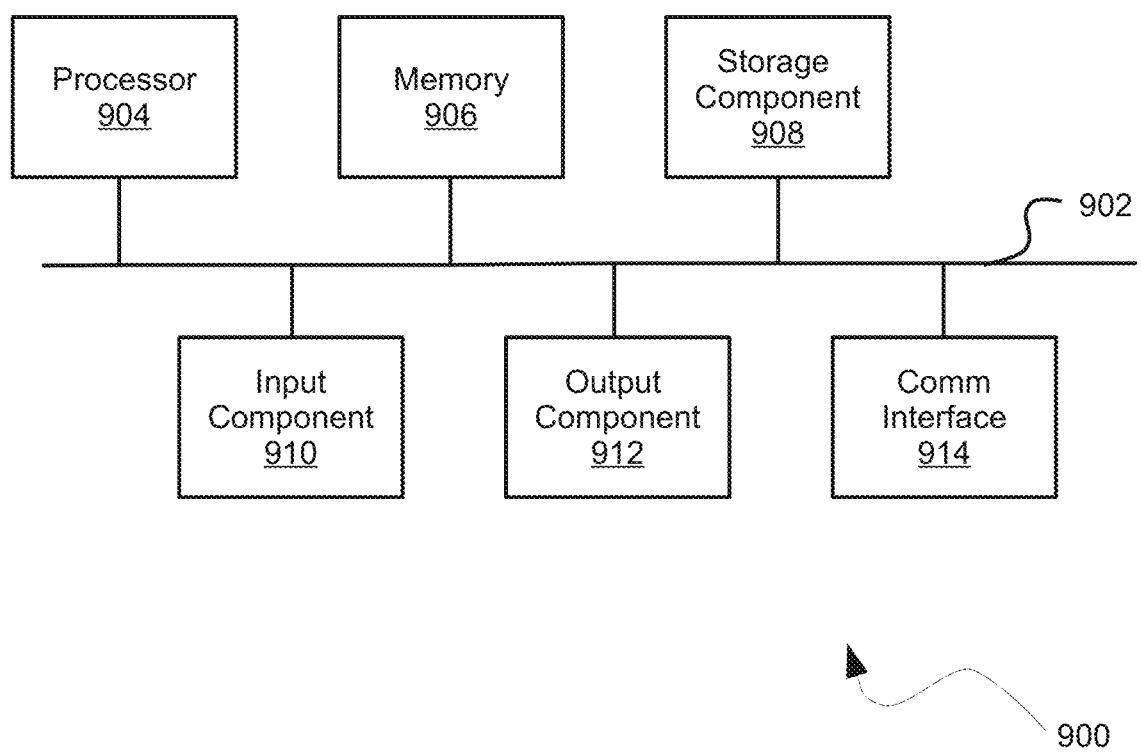
FIG. 4 is a diagram of one or more components, devices, and/or systems according to non-limiting embodiments.

Referring now to FIG. 4, shown is a diagram of example components of a device 900 according to non-limiting embodiments. Device 900 may correspond to the server computer 102, client computer 108, and/or interface design engine 106 shown in FIG. 1. In some non-limiting embodiments, such systems or devices may include at least one device 900 and/or at least one component of device 900. The number and arrangement of components shown in FIG. 4 are provided as an example. In some non-limiting embodiments, device 900 may include additional components, fewer components, different components, or differently arranged components than those shown in FIG. 4. Additionally, or alternatively, a set of components (e.g., one or more components) of device 900 may perform one or more functions described as being performed by another set of components of device 900.

As shown in FIG. 4, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 4, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment, and one or more steps may be taken in a different order than presented in the present invention.

The invention claimed is:

1. A computer-implemented method for providing an interactive user interface, comprising:
   generating, with at least one processor, a user interface comprising a visual representation of a body having a garment arranged thereon;
   generating, with at least one processor, a plurality of vector lines corresponding to portions of the body and the garment, the plurality of vector lines visible on the user interface, wherein each vector line of the plurality of vector lines comprises two ends and at least three points including a start point, an end point, and at least one middle point, the start point located at a first end of the two ends of each vector line, the end point located at a second end of the two ends of each vector line, and the at least one middle point located on each vector line between and spaced apart from the start point and the end point;
   downloading, in a client-side application executing on a computing device displaying the user interface, a plurality of images corresponding to different visual representations of the body and the garment prior to detecting a user input;
   detecting, with at least one processor, the user input on an end portion of the garment corresponding to a vector line of the plurality of vector lines, the end portion of the garment aligned with a first point of the at least three points of the vector line, the user input comprising a movement of the end portion away from the first point and toward a second point of the at least three points of the vector line, and wherein the end portion of the garment comprises at least one of the following: a sleeve edge, a pant leg edge, a skirt edge, a neck edge, a shirt edge, a waist edge, or any combination thereof, and wherein the vector line comprises a curved line corresponding to a curve of the body;
   in response to the user input, making, with at least one processor, the vector line of the plurality of vector lines invisible;
   determining, with at least one processor, a-the second point of the at least three points of the vector line based on the user input on the end portion of the garment;
   automatically modifying the visual representation of the garment to move the end portion in alignment with the second point of the at least three points in response to determining the second point of the vector line, wherein automatically modifying the visual representation of the garment comprises:
      determining at least one image segment of the visual representation corresponding to the end portion aligning with the first point of the at least three points of the vector line; and
      replacing the at least one image segment with at least one replacement image segment corresponding to the end portion aligning with the second point of the at least three points of the vector line, the at least one replacement image segment comprising one or more other images of the plurality of images;
   detecting, with at least one processor, a second user input on a second end portion of the garment corresponding to a second vector line of the plurality of vector lines, wherein the second vector line is different than the vector line, and wherein the second end portion of the garment is different than the end portion of the garment, the second end portion of the garment aligned with a first point of the at least three points of the second vector line, the second user input comprising a movement of the second end portion away from the first point and toward a second point of the second vector line, wherein the second end portion of the garment comprises at least one of the following: a sleeve edge, a pant leg edge, a skirt edge, a neck edge, a shirt edge, a waist edge, or any combination thereof;
   determining, with at least one processor, the second point of the at least three points of the second vector line based on the second user input on the second end portion of the garment; and
   automatically modifying the visual representation of the garment to move the second end portion in alignment with the second point of the at least three points in response to determining the second point, wherein automatically modifying the visual representation of the garment comprises:
      determining at least one second image segment of the visual representation corresponding to the second end portion aligning with the first point of the at least three points of the second vector line; and
      replacing the at least one second image segment with at least one second replacement image segment corresponding to the second end portion aligning with the second point of the at least three points of the second vector line, the at least one second replacement image segment comprising one or more other images of the plurality of images.

2. A system for providing an interactive user interface, comprising:
   at least one data storage device comprising an image database including a plurality of images; and
   at least one processor in communication with the at least one data storage device, the at least one processor programmed or configured to:
      generate a user interface comprising a visual representation of a body having a garment arranged thereon based on at least one image of the plurality of images;
      generate a plurality of vector lines corresponding to portions of the body and the garment, the plurality of vector lines visible on the user interface, wherein each vector line of the plurality of vector lines comprises two ends and at least three points including a start point, an end point, and at least one middle point, the start point located at a first end of the two ends of each vector line, the end point located at a second end of the two ends of each vector line, and the at least one middle point located on each vector line between and spaced apart from the start point and the end point;

download, in a client-side application executing on a computing device displaying the user interface, a plurality of images corresponding to different visual representations of the body and the garment prior to detecting a user input;

detect the user input on an end portion of the garment corresponding to a vector line of the plurality of vector lines, the end portion of the garment aligned with a first point of the at least three points of the vector line, the user input comprising a movement of the end portion away from the first point and toward a second point of the at least three points of the vector line, and wherein the end portion of the garment comprises at least one of the following: a sleeve edge, a pant leg edge, a skirt edge, a neck edge, a shirt edge, a waist edge, or any combination thereof, and wherein the vector line comprises a curved line corresponding to a curve of the body;

in response to the user input, make the vector line of the plurality of vector lines invisible;

determine a second point of the at least three points of the vector line based on the user input on the portion of the garment;

automatically modify the visual representation of the garment to move the end portion in alignment with the second point of the at least three points in response to determining the second point of the vector line, wherein automatically modifying the visual representation of the garment comprises:
  determining at least one image segment of the visual representation corresponding to the end portion aligning with the first point of the at least three points of the vector line; and
  replacing the at least one image segment with at least one replacement image segment corresponding to the end portion aligning with the second point of the at least three points of the vector line, the at least one replacement image segment comprising one or more other images of the plurality of images;

detect a second user input on a second end portion of the garment corresponding to a second vector line of the plurality of vector lines, wherein the second vector line is different than the vector line, and wherein the second end portion of the garment is different than the end portion of the garment, the second end portion of the garment aligned with a first point of the at least three points of the second vector line, the second user input comprising a movement of the second end portion away from the first point and toward a second point of the second vector line, wherein the second end portion of the garment comprises at least one of the following: a sleeve edge, a pant leg edge, a skirt edge, a neck edge, a shirt edge, a waist edge, or any combination thereof;

determine the second point of the at least three points of the second vector line based on the second user input on the second end portion of the garment; and automatically modify the visual representation of the garment to move the second end portion in alignment with the second point of the at least three points in response to determining the second point, wherein automatically modifying the visual representation of the garment comprises:
  determining at least one second image segment of the visual representation corresponding to the second end portion aligning with the first point of the at least three points of the second vector line; and
  replacing the at least one second image segment with at least one second replacement image segment corresponding to the second end portion aligning with the second point of the at least three points of the second vector line, the at least one second replacement image segment comprising one or more other images of the plurality of images.

3. A computer program product for providing an interactive user interface, comprising at least one non-transitory computer-readable medium including program instructions that, when executed by at least one processor, cause the at least one processor to:

generate a user interface comprising a visual representation of a body having a garment arranged thereon based on at least one image of a plurality of images;

generate a plurality of vector lines corresponding to portions of the body and the garment, the plurality of vector lines visible on the user interface, wherein each vector line of the plurality of vector lines comprises at least three points including a start point, an end point, and at least one middle point, the start point located at a first end of the two ends of each vector line, the end point located at a second end of the two ends of each vector line, and the at least one middle point located on each vector line between and spaced apart from the start point and the end point;

download, in a client-side application executing on a computing device displaying the user interface, a plurality of images corresponding to different visual representations of the body and the garment prior to detecting a user input;

detect the user input on an end portion of the garment corresponding to a vector line of the plurality of vector lines, the end portion of the garment having an end portion aligned with a first point of the at least three points of the vector line, the user input comprising a movement of the end portion away from the first point and toward a second point of the at least three points of the vector line, and wherein the end portion of the garment comprises at least one of the following: a sleeve edge, a pant leg edge, a skirt edge, a neck edge, a shirt edge, a waist edge, or any combination thereof, and wherein the vector line comprises a curved line corresponding to a curve of the body;

in response to the user input, make the vector line of the plurality of vector lines invisible;

determine the second point of the at least three points of the vector line based on the user input on the end portion of the garment;

automatically modify the visual representation of the garment to move the end portion in alignment with the second point of the at least three points in response to determining the second point of the vector line, wherein automatically modifying the visual representation of the garment comprises:
  determining at least one image segment of the visual representation corresponding to the end portion aligning with the first point of the at least three points of the vector line; and
  replacing the at least one image segment with at least one replacement image segment corresponding to the end portion aligning with the second point of the at least three points of the vector line, the at least one replacement image segment comprising one or more other images of the plurality of images;

detect a second user input on a second end portion of the garment corresponding to a second vector line of the plurality of vector lines, wherein the second vector line is different than the vector line, and wherein the second end portion of the garment is different than the end portion of the garment, the second end portion of the garment aligned with a first point of the at least three points of the second vector line, the second user input comprising a movement of the second end portion away from the first point and toward a second point of the second vector line, wherein the second end portion of the garment comprises at least one of the following: a sleeve edge, a pant leg edge, a skirt edge, a neck edge, a shirt edge, a waist edge, or any combination thereof;

determine the second point of the at least three points of the second vector line based on the second user input on the second end portion of the garment; and automatically modify the visual representation of the garment to move the second end portion in alignment with the second point of the at least three points in response to determining the second point, wherein automatically modifying the visual representation of the garment comprises:

determining at least one second image segment of the visual representation corresponding to the second end portion aligning with the first point of the at least three points of the second vector line; and replacing the at least one second image segment with at least one second replacement image segment corresponding to the second end portion aligning with the second point of the at least three points of the second vector line, the at least one second replacement image segment comprising one or more other images of the plurality of images.

* * * * *

UNITED STATES PATENT AND TRADEMARK OFFICE
CERTIFICATE OF CORRECTION

| | | |
|---|---|---|
| PATENT NO. | : 11,321,499 B2 | Page 1 of 1 |
| APPLICATION NO. | : 16/846674 | |
| DATED | : May 3, 2022 | |
| INVENTOR(S) | : Willy Hwang Lai et al. | |

It is certified that error appears in the above-identified patent and that said Letters Patent is hereby corrected as shown below:

In the Claims

Column 11, Line 59, Claim 1, delete "a-the" and insert -- the --

Column 14, Lines 36-37, Claim 3, delete "garment having an end portion" and insert -- garment --

Signed and Sealed this
Nineteenth Day of July, 2022

*Katherine Kelly Vidal*

Katherine Kelly Vidal
*Director of the United States Patent and Trademark Office*